(12) United States Patent
Noldus et al.

(10) Patent No.: US 10,491,640 B2
(45) Date of Patent: Nov. 26, 2019

(54) METHOD AND MEDIA HANDLING UNIT FOR USE IN A VOIP BASED COMMUNICATIONS NETWORK

(75) Inventors: Rogier August Caspar Joseph Noldus, Goirle (NL); Jos Den Hartog, Capelle a/d Ijssel (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 451 days.

(21) Appl. No.: 14/366,437

(22) PCT Filed: Dec. 22, 2011

(86) PCT No.: PCT/EP2011/073870
§ 371 (c)(1),
(2), (4) Date: Oct. 9, 2014

(87) PCT Pub. No.: WO2013/091718
PCT Pub. Date: Jun. 27, 2013

(65) Prior Publication Data
US 2015/0163253 A1 Jun. 11, 2015

(51) Int. Cl.
*H04L 29/06* (2006.01)
*H04M 7/00* (2006.01)

(52) U.S. Cl.
CPC ...... *H04L 65/1006* (2013.01); *H04L 65/1089* (2013.01); *H04L 65/604* (2013.01); *H04L 65/605* (2013.01); *H04L 65/80* (2013.01); *H04M 7/006* (2013.01)

(58) Field of Classification Search
CPC ........... H04B 7/18589; H04L 7/005; H04L 29/06503; H04L 29/08702; H04L 49/9005; H04L 65/604; H04L 67/2842
See application file for complete search history.

(56) References Cited

U.S. PATENT DOCUMENTS 8,402,494 B1 * 3/2013 Hu ................. H04N 5/268
709/230
8,533,259 B2 * 9/2013 Wolf ............... H04N 21/23424
709/203

(Continued)

FOREIGN PATENT DOCUMENTS

WO  2008069722 A2  6/2008
WO  2011008789 A1  1/2011

OTHER PUBLICATIONS

Handley, M. et al., "SDP: Session Description Protocol", Network Working Group, Request for Comments 4566, The Internet Society, Jul. 2006, 1-49.

(Continued)

*Primary Examiner* — Jason E Mattis
*Assistant Examiner* — Hong Shao
(74) *Attorney, Agent, or Firm* — Murphy, Bilak & Homiller, PLLC

(57) ABSTRACT

The invention relates to a method and a media handling unit (8) for switching from forwarding a first media stream to forwarding a second media stream to a media recipient (2) in a VoIP based communications network. According to the invention, the first and second media streams are buffered in memory (14,16) prior to switching, providing slack time to allow switching without disturbance.

15 Claims, 6 Drawing Sheets

(56) References Cited

U.S. PATENT DOCUMENTS

| | | | | |
|---|---|---|---|---|
| 8,904,453 B2* | 12/2014 | Stewart | H04N 21/439 | 725/32 |
| 2002/0191116 A1* | 12/2002 | Kessler | H04N 21/44004 | 348/723 |
| 2007/0047515 A1* | 3/2007 | Jonsson | H04L 49/90 | 370/352 |
| 2007/0263066 A1* | 11/2007 | Henning | H04N 5/4401 | 348/14.01 |
| 2009/0003247 A1* | 1/2009 | Katis | H04L 12/1831 | 370/260 |
| 2009/0285175 A1* | 11/2009 | Nix | H04L 29/125 | 370/331 |
| 2010/0023637 A1* | 1/2010 | Kamath | H04L 65/601 | 709/231 |
| 2010/0150154 A1* | 6/2010 | Viger | H04L 12/4633 | 370/389 |
| 2011/0066703 A1* | 3/2011 | Kaplan | H04L 65/4084 | 709/219 |
| 2011/0167104 A1* | 7/2011 | Gupta | H04L 65/4061 | 709/203 |
| 2011/0185021 A1* | 7/2011 | Han | H04L 65/1016 | 709/204 |
| 2012/0039391 A1* | 2/2012 | Frusina | H04L 47/25 | 375/240.07 |
| 2012/0057683 A1* | 3/2012 | Liik | H04M 3/42195 | 379/32.01 |

OTHER PUBLICATIONS

Rosenberg, J. et al., "An Offer/Answer Model with the Session Description Protocol (SDP)", Network Working Group, Request for Comments 3264, The Internet Society, Jun. 2002, 1-25.

Rosenberg, J. et al., "SIP: Session Initiation Protocol", Network Working Group, Request for Comments 3261, The Internet Society, Jun. 2002, 1-269.

* cited by examiner

METHOD AND MEDIA HANDLING UNIT FOR USE IN A VOIP BASED COMMUNICATIONS NETWORK

TECHNICAL FIELD

The invention relates to a method and network node for switching from forwarding a first media stream to forwarding a second media stream to a recipient in a Voice over Internet Protocol (VoIP) based communications network.

BACKGROUND

A media stream that is sent from one party to another party, may be sent directly between the respective parties' media termination point or via an intermediate media handling device. Herein forwarding a media stream is understood to encompass forwarding a media stream towards a party's user equipment—e.g. by an intermediate handling device—as well as to a user interface of the party's user equipment itself, e.g. by a communications application of the user equipment.

Applications are known per se in which is switched from forwarding a first media stream to forwarding a second media stream to a recipient. Such applications include personal greeting services and mid-call announcements. The switching from the first media stream to the second media stream may be of the head-to-tail type, wherein the second media stream is being forwarded upon termination of the first media stream. The switching from the first media stream to the second media stream may also include a period of overlap in which the two media streams are mixed in a mixer device (e.g. fade in/fade out) and the mixed media stream is forwarded to the recipient.

An example is a personal greeting service with greeting fade out. When a call is answered, the personal greeting (first stream) is mixed with the media of the destination party (second stream) and is then faded out over a short period of time, e.g. 3 s.

Another example is an in-call announcement with fade in and fade out. The announcement is faded into a media speech channel towards the served subscriber (for whom the announcement is destined). When the announcement is complete, it is faded out of the media speech channel towards the served subscriber. For the playing of a mid-call announcement towards one party receiving a first media stream in a Session Initiation Protocol (SIP) session, the Session Description Protocol (SDP) for that party is updated. The updated SDP has the effect that this party in the SIP session will expect a second media stream from another remote party, e.g. an announcement device.

The known methods present several drawbacks. The known switching from the first media stream to the second media stream has the inherent effect that there may be disturbance of media streaming towards the served subscriber. For instance, the arrival of media in accordance with the updated SDP will, in practice, not be synchronized with the moment that the respective UA starts listening to the new media stream.

Also the known use of a mixer device when switching from the first media stream to the second media stream has several drawbacks. Linking in a media mixer device into a speech path leads to a sudden increase in latency. While latency as such is directly resulting from the use of a mixer, the linking in of the media mixer device leads to a brief period of silence, since the media mixer device has to fill up synchronization buffers associated with the respective input media streams. For instance, if the synchronization buffer has a length of 50 ms, then the effect is a period of silence of 50 ms, before speech streaming continues. Further, when removing a media mixer device from the speech path, the media stream has to 'catch up'. If the synchronization buffer has a length of 50 ms and this synchronization buffer is removed from the media stream path, then 50 ms of speech would be 'dropped' and the media stream is abruptly advanced by 50 ms.

These effects will lead to audible disturbance when switching from forwarding the first media stream to forwarding the second media stream.

SUMMARY OF THE INVENTION

It is an object of the invention to obviate at least some of the above mentioned disadvantages and provide an improved method and device for media stream handling. It is a further object of the present invention to allow for in-session update of a media stream in accordance with an updated Session Description Protocol (SDP) without disturbance. It is a further object of the present invention to allow for smooth, ad hoc insertion and removal of a media mixer device in a media (speech) stream path without disturbance. Thereto, according to the invention is provided a method for switching from forwarding a first media stream to forwarding a second media stream to a recipient in a Voice over Internet Protocol (VoIP) based communications network, including the steps of:

while receiving the first media stream, prior to forwarding the data of the first media stream buffering, e.g. temporarily storing, a first amount of data of the first media stream in a first memory, retrieving the first media stream from the first memory and forwarding it to the recipient, receiving the second media stream and buffering, e.g. temporarily storing, a second amount of data of the second media stream in a second memory, stepwise increasing the amount of data of the first media stream stored in the first memory, until the first memory stores a third amount of data of the first media stream ceasing receiving the first media stream, and continuing forwarding data of the first media stream contained in the first memory to the recipient, and retrieving data of the second media stream from the second memory and forwarding it to the recipient.

It is possible that the step of forwarding the data of the second media stream from the second memory to the recipient starts upon forwarding the last data of the first media stream from the first memory. Hence, the second media stream follows the first media stream in a head-to-tail fashion.

It is also possible that the step of forwarding the data of the second media stream from the second memory to the recipient starts prior to forwarding the last data of the first media stream from the first memory. Hence, a period of overlap is provided in which both the first media stream and the second media stream are forwarded to the recipient.

Providing the first and second memories provides the advantage that the start of forwarding the second media stream can be accurately synchronised with the first media stream. The start of forwarding the second media stream can for instance be synchronised with the end of the first media stream. The start of forwarding the second media stream can also be synchronised with the first media stream prior to the end of the first media stream for providing the period of overlap.

The first and second memories act as first-in-first-out (FIFO) buffers. Hence, the first memory introduces a first latency in the first media stream. The second memory introduces a predetermined second latency in the second media stream.

In view of the stepwise increasing of the amount of data of the first media stream stored in the first memory, the latency in the first media stream is stepwise increased, e.g. to a predetermined third latency. When the amount of data stored in the first memory is thus increased prior to switching to forwarding the second media stream, the increased latency in forwarding the first media stream allows for accurate synchronisation of the second media stream relative to the first media stream. The amount of data of the second media stream stored in the second memory may be similarly increased mutatis mutandis.

Preferably, the step size of stepwise increasing the amount of data of the first/second media stream buffered in the first/second memory is chosen to be unnoticeable to a human observer. A step size may for instance correspond with an amount of data representing 1-20 ms of the media stream e.g. 10 ms. The steps may e.g. be introduced at an interval of 10-1000 ms, e.g. a 10 ms step every 200 ms, or a 10 ms step every 400 ms, or a 1 ms step every 20 ms, or a 20 ms step every 400 ms.

The first memory is used as a first media reception buffer. The second memory is used as a second media reception buffer. Optionally, the first amount of data of the first media stream stored in the first memory equals a size of the first memory. Hence, the first memory is completely filled. In this case increasing the amount of data of the first media stream stored in the first memory includes increasing the size of the first memory. The same applies to the second memory, mutatis mutandis.

Optionally, the method further includes the step of indicating an imminent switch from forwarding the first media stream to forwarding the second media stream and starting increasing the amount of data of the first media stream stored in the first memory prior to reception of the second media stream.

For instance, when an entity in an Internet Protocol Multimedia Subsystem (IMS) core network, such as an Application Server (AS), intends to initiate SDP update for a served party, it may, prior to initiating the SDP update, instruct the served party to build up an increased first media reception buffer. The SDP update then takes place when the served party has increased the first media reception buffer. The served party may then continue to play out media from the 'old SDP' (first media stream) until media from the 'new SDP' (second media stream) arrives. This playing out media from the old SDP is possible even when no more data is arriving related to that first media stream (the first media stream has ended). In such case, there is slack provided by the increased first media reception buffer length.

When said entity in the IMS core network, such as the AS, initiates again SDP update for the served party, e.g. to connect the served party to the remote party, the increased reception buffer is still in place. The switch over from the new SDP (second media stream) back to the old SDP (first media stream) may therefore be done in the same manner as described above. That is, the served party continues to play out data from the second media stream (e.g. from an announcement server), until media from the remote party (first media stream) arrives. Again, the slack provided by the increased second media reception buffer length is utilised hereto.

When the switch back to the old SDP (first media stream) is complete, the increased reception buffer may be removed as described below, without causing disturbance, at least without causing humanly noticeable, e.g. audible, disturbance.

When the period of overlap is provided in which both the first media stream and the second media stream are forwarded to the recipient, it is possible to include a mixer device in the respective media paths of the two media streams so as to mix the two media streams (e.g. fade in/fade out) and forward the mixed media stream to the recipient. It is also possible to link the mixer device into the two media streams.

Optionally, prior to linking the mixer device into the first media stream, the amount of data of the first media stream stored in the first memory is increased to the third amount of data. Preferably, the third amount of data is greater than or equal to the amount of data associated with a synchronisation buffer of the mixer device. Preferably, the third latency is greater than or equal to a latency of the mixer device. Hence, while linking the mixer device into the first media stream it is possible to keep forwarding data of the first media stream from the first memory while filling the synchronisation buffer of the mixer device. Hence, it is possible to link the mixer device into the first media stream without noticeable period of silence. Here, the synchronisation buffer of the mixer device can be formed by the first (and optionally second) memory.

Optionally, the method further comprises stepwise decreasing the amount of data of the first media stream stored in the first memory. Hence, the latency in the first media stream is stepwise decreased. Optionally, the method further comprises stepwise decreasing the amount of data of the second media stream stored in the second memory. Hence, the latency in the second media stream is stepwise decreased. Hence it is possible to stepwise decrease the amount of data of the second media stream stored in the second memory while retrieving the data of the second media stream from the second memory and forwarding it to the recipient until the second media reception buffer includes a fourth amount of data of the second media stream.

When the first media stream has ended and the second media stream is being forwarded to the recipient and a mixer device is (still) present in the second media stream, there is no more use for the mixer device. Hence, the mixer device can be removed from the second media stream.

The mixer device may be removed from the second media stream by stepwise reducing the length of the synchronisation buffer of the mixer device, e.g. by a defined step-length. Each time the synchronisation buffer length is reduced by the defined step-length, a number of media samples, constituting media in length equal to the step-length, are dropped. This process may be spread out over a period, of e.g. 3 s. For example, when the synchronization buffer of the mixer device has a length of 50 ms, a step-length of 2 ms may be chosen. This implies that the synchronisation buffer is reduced in 25 steps of 2 ms each. This process may be spread out over 2.5 s. This results in that every 100 ms 2 ms of media (e.g. speech) at the front of the synchronization buffer are dropped and the synchronisation buffer is reduced by 2 ms in length. When the synchronisation buffer has reached a length of 0, it may be removed from the second media stream without noticeable (e.g. audible) disturbance.

It will be appreciated that removing the mixer device from the media path and updating the media stream have in common that they are based on ad-hoc increase and/or decrease of the amount of data stored in the memory or media synchronisation buffer. This ad-hoc increase and decrease of the amount of data stored in the memory/media synchronisation buffer allows for modifying the media stream connection without noticeable (e.g. audible) disturbance. The increased amount of data of the media stream in the memory/media synchronisation buffer is used to compensate for non-synchronised media arrival related to the two media streams.

The invention also relates to a Media handling unit arranged for switching from forwarding a first media stream to forwarding a second media stream to a recipient in a VoIP based network, including:

a first reception unit arranged for receiving the first media stream, a second reception unit arranged for receiving the second media stream, a selection unit arranged for selecting the first media stream and/or the second media stream, a forwarding unit arranged for forwarding the data of the selected first and/or selected second media stream, a first memory having a first size arranged for temporarily storing data of the first media stream prior to forwarding data of the first media stream, a second memory having a second size arranged for temporarily storing data of the second media stream prior to forwarding data of the second media stream, a memory size controller arranged for stepwise increasing or decreasing at least one of the amount of data of the first and/or second media stream stored in the first and/or second memory respectively, and the size of the first and/or second memory, and a controlling unit, wherein the controlling unit is arranged for:

instructing the memory size controller to stepwise increase the amount of data of the first media stream stored in the first memory, or the size of the first memory while forwarding the data of the first media stream prior to switching from forwarding the first media stream to forwarding the second media stream, and/or instructing the memory size controller to stepwise decrease the amount of data of the second media stream stored in the second memory, or the size of the second memory while forwarding the data of the second media stream after switching from forwarding the first media stream to forwarding the second media stream.

The media handling unit can be included in a network entity, such as a Multimedia Resource Function Processor (MRFP) or an SBG (Session Border Gateway) for forwarding the first and/or second media stream to a receiving User Agent. The media handling unit can also be included in a terminal, such as a User Equipment, for forwarding the first and/or second media stream to a recipient such as a media playback unit of the terminal.

BRIEF DESCRIPTION OF THE DRAWINGS

The invention will now be further elucidated by means of non-limiting examples referring to the drawings, in which.

DETAILED DESCRIPTION

Figure 1:
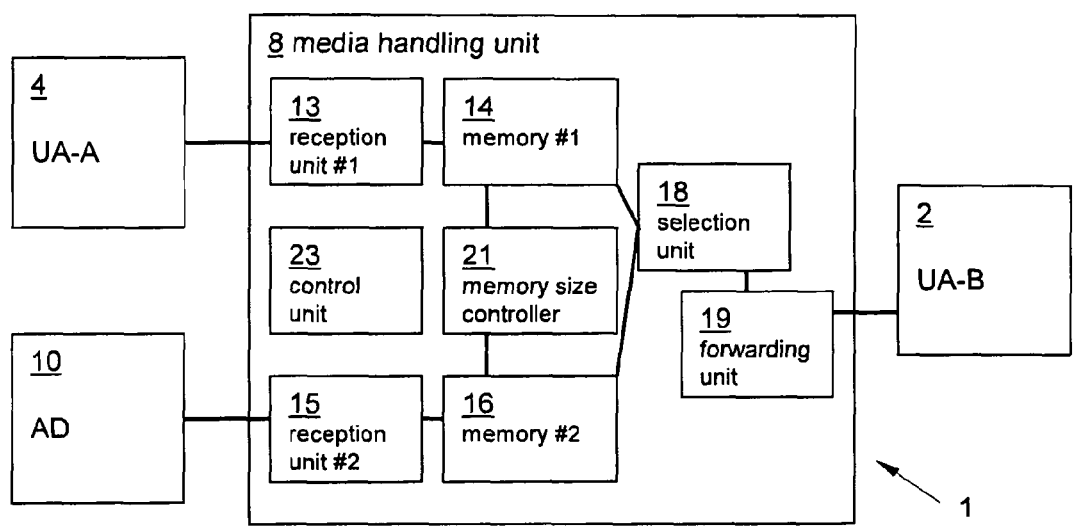
FIG. 1 is an embodiment of a system according to the invention.

FIG. 1 shows a schematic representation of a Voice over Internet Protocol (VoIP) based communications network 1. In FIG. 1 the network includes a media recipient 2, here User Agent (UA-B) 2. In FIG. 1 the network 1 further includes a first media source 4, here an originating User Agent (UA-A) 4. The first media source 4 transmits a first media stream 6, e.g. a first audio stream, towards the media recipient 2. In the example of FIG. 1 the first media stream 6 is forwarded to the media recipient 2 by a media handling unit 8. FIG. 1 further depicts a second media source 10, here an in-call announcement device (AD) 10. At a certain point in time the second media source 10 starts transmitting a second media stream 12 towards the media recipient 2. The media handling unit 8 is arranged for switching from forwarding the first media stream 6 to forwarding the second media stream 12 to the media recipient 2.

The media handling unit 8 can be included in a network entity, such as a Multimedia Resource Function Processor (MRFP) or a Session Border Gateway (SBG) for forwarding the first and/or second media stream (6, 12) to a receiving User Agent. The media handling unit 8 can also be included in a terminal, such as a User Equipment (UE), for forwarding the first and/or second media stream (6, 12) to a recipient such as a media playback unit of the terminal.

The media handling unit 8 includes a first reception unit 13 for receiving the first media stream (6). The media handling unit 8 includes a second reception unit 15 for receiving the second media stream (12). The media handling unit 8 includes a first memory 14. The first media stream is temporarily stored in the first memory 14 before being forwarded to the media recipient 2. Herein the first memory 14 is used as a First-In-First-Out (FIFO) memory. Here the first memory is a first media reception buffer 14. The first media stream 6 received by the media handling unit 8 is thus buffered in the first media reception buffer 14. While forwarding the first media stream 6 to the media recipient 2, the first media stream is read from the first media reception buffer 14. The media handling unit 8 further includes a second memory 16. The second media stream is temporarily stored in the second memory 16 before being forwarded to the media recipient 2. Herein the second memory 16 is used as a First-In-First-Out (FIFO) memory. Here the second memory is a second media reception buffer 16. The second media stream 12 received by the media handling unit 8 is thus buffered in the second media reception buffer 16. While forwarding the second media stream 12 to the media recipient 2, the second media stream is read from the second media reception buffer 16.

In use, the media handling unit 8 forwarding the data of the first media stream 6 to the media recipient 2 while buffering a first amount of data of the first media stream 6 in the first media reception buffer 14. Upon receipt of the second media stream 12 a second amount of data of the second media stream 12 is buffered in the second media reception buffer 16. When the first media stream 6 ends, i.e. no more data of the first media stream is received by the media handling unit 8, the media handling unit 8 continues forwarding the data of the first media stream 6 contained in the first media reception buffer 14 to the media recipient 2. The media handling unit 8 includes a selection unit 18 arranged for switching to forwarding the data of the second media stream 12 from the second media reception buffer 16 to the media recipient 2. The media handling unit further includes a forwarding unit 19 for forwarding the selected media stream(s).

Figure 2A:
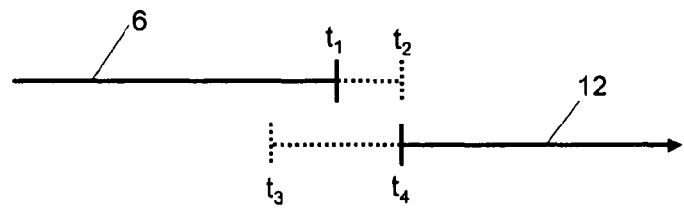
FIG. 2 is a schematic timing diagram of the invention.
Figure 2B:
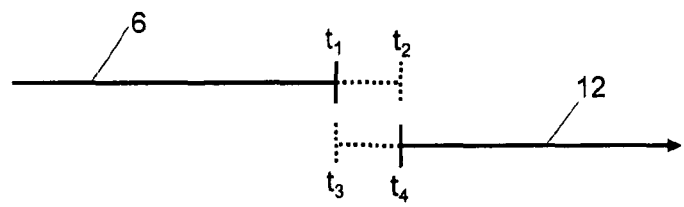
Figure 2C:
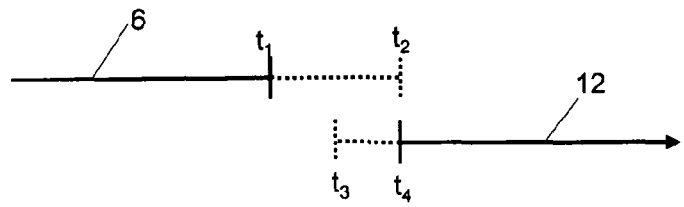

It is possible that the selection unit 18 starts forwarding the data of the second media stream 12 from the second media reception buffer 16 to the media recipient 2 upon forwarding the last data of the first media stream 6 from the first media reception buffer 14. Hence, the second media stream 12 follows the first media stream 6 in a head-to-tail fashion. FIG. 2A-FIG. 2C show examples of timing diagrams. At moment $t_1$ the media handling unit 8 stops receiving the first media stream 6 but continues forwarding data from the first media reception buffer 14. At moment $t_2$ the first media reception buffer 14 is empty. At $t_3$ the media handling unit starts receiving the second media stream 12 and starts filling the second media reception buffer 16. At $t_4$ the selection unit 18 switches from forwarding data of the first media stream 6 from the first media reception buffer 14 to forwarding data of the second media stream 12 from the second media reception buffer 16.

Figure 2D:
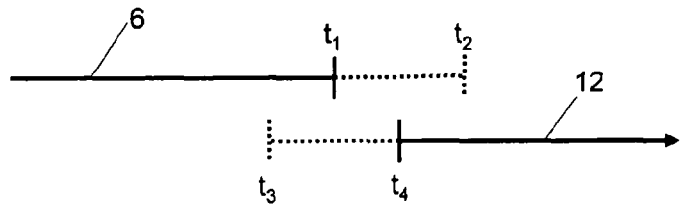

It is possible that the selection unit 18 starts forwarding the data of the second media stream 12 from the second media reception buffer 16 to the media recipient 2 prior to forwarding the last data of the first media stream 6 from the first media reception buffer 14. Hence, a period of overlap is provided in which both the first media stream 6 and the second media stream 12 are forwarded to the recipient. The selection unit 18 is arranged for, during the period of overlap, forwarding both the first and the second media stream 6, 12. In FIG. 2D an example of such overlap is given.

Providing the first and second media reception buffer 14, 16 provides the advantage that the start of forwarding the second media stream 12 can be accurately synchronised with the first media stream 6. The start of forwarding the second media stream 12 can for instance be synchronised with the end of the first media stream 6. The start of forwarding the second media stream 12 can also be synchronised with the first media stream 6 prior to the end of the first media stream 6 for providing the period of overlap.

The media handling unit 8 further includes a controlling unit 23 for controlling the functioning of the first and second reception unit 13, 15, the first and second media reception buffer 14, 16, the selection unit 18, the forwarding unit 19, and/or buffer size controller 21.

The selection unit 18 can be designed as a part of a media mixing device 20. The media mixing device 20 can be used during the period of overlap. During the period of overlap, the first and second media streams 6, 12 can be mixed by the media mixing device 20, e.g. for providing a fade in/fade out of the two media streams 6, 12.

The media mixer device 20 (particularly for speech) applies synchronization buffers for the purpose of producing two synchronized media streams that are mixed into a combined media stream. The synchronization has two aspects: de-jittering and packet synchronization (the media streams to be mixed may be sent with different packetization time, e.g. one stream with 20 ms packetization time and another stream with 30 ms packetization time).

The use of synchronization buffers in the media mixer device 20 results in additional latency in the media transfer by the media mixer device 20. When the media mixer device 20 is removed from the media path, then this additional latency no longer exists. Likewise, when the media mixer device 20 is linked into the media path, then this results in a sudden increase in latency. The first media reception buffer 14 can function as a first synchronization buffer for the media mixer device 20. The second media mixer device 16 can function as a second synchronization buffer for the media mixer device 20.

The media mixing device 20 described so far may reside in a network node, such as a Multimedia Resource Function Processor (MRFP), or may reside in a terminal. IETF SIP allows for multi-party calls that are established by and controlled by a SIP user agent (UA). In such case, there will be a media mixer device in the terminal.

When the first media stream 6 is no longer forwarded to the media recipient 2, the number of forwarded media streams has reduced to 1, viz. only the second media stream 12. Then the media mixing device 20 is no longer needed and can be removed from the media path. For example, when a personal greeting (e.g. formed by the first media stream 6) has faded out from the media path, the personal greeting media stream 6 will cease. The media mixer device 20 can then be removed from the media path. This will be described in more detail below.

The system 1 as described above can for example be used for the playing of a mid-call announcement. For the playing of a mid-call announcement towards the media recipient 2 receiving the first media stream 6 in a Session Initiation Protocol (SIP) session, the Session Description Protocol (SDP) for the media stream towards that media recipient 2 is updated. The updated SDP has the effect that this media recipient 2 in the SIP session will expect to receive a second media stream 12 from another remote party, e.g. the announcement device 10.

SIP signaling is used to negotiate the new SDP with the destination User Agent (UA-B), for the case where UA-B is the served party to whom an announcement must be played. The SIP signaling for the SDP update (re-Invite; offer-answer rules; refer IETF RFC 3261 and IETF RFC 3264) is known to the informed reader, so is not elaborated here. The effect of the SDP update for UA-B is that UA-B will switch from receiving and processing the first media stream 6 (e.g. speech) from the remote party UA-A 4 to expecting to receive the second media stream 12 (e.g. speech) from the announcement server 10.

UA-B will at a certain moment t=T switch over from listening to the first media stream 6 to listening to the second media stream 12. This moment t=T is under control of SIP signaling. More specifically, when the new SDP negotiation is completed and confirmed (offer-answer sequence completed), UA-B will start listening, i.e. expecting to receive, to the second media stream 12. The signaling is to/from a designated entity in the Internet Protocol Multimedia Subsystem (IMS) network, such as a SIP Application Server (SIP-AS). The media stream is flowing between the UA-B and the remote party UA-A (first media stream 6) and between the UA-B and the announcement server 10 (second media stream 12).

The UA-B will switch over from expecting to receive the first media stream 6 to expecting to receive the second media stream 12 at moment t=T. The moment t=T may be somewhere between the sending of 200 Ok by UA-B (typically containing the new SDP offer) and the receiving of Ack by UA-B (typically containing the new SDP answer). The exact moment t=T may be implementation dependent. Also, the exact moment t=T may depend on the moment that the first packet related to the second media stream 12 arrives.

Removing a Mixer Device from a Media Path

Figure 3:
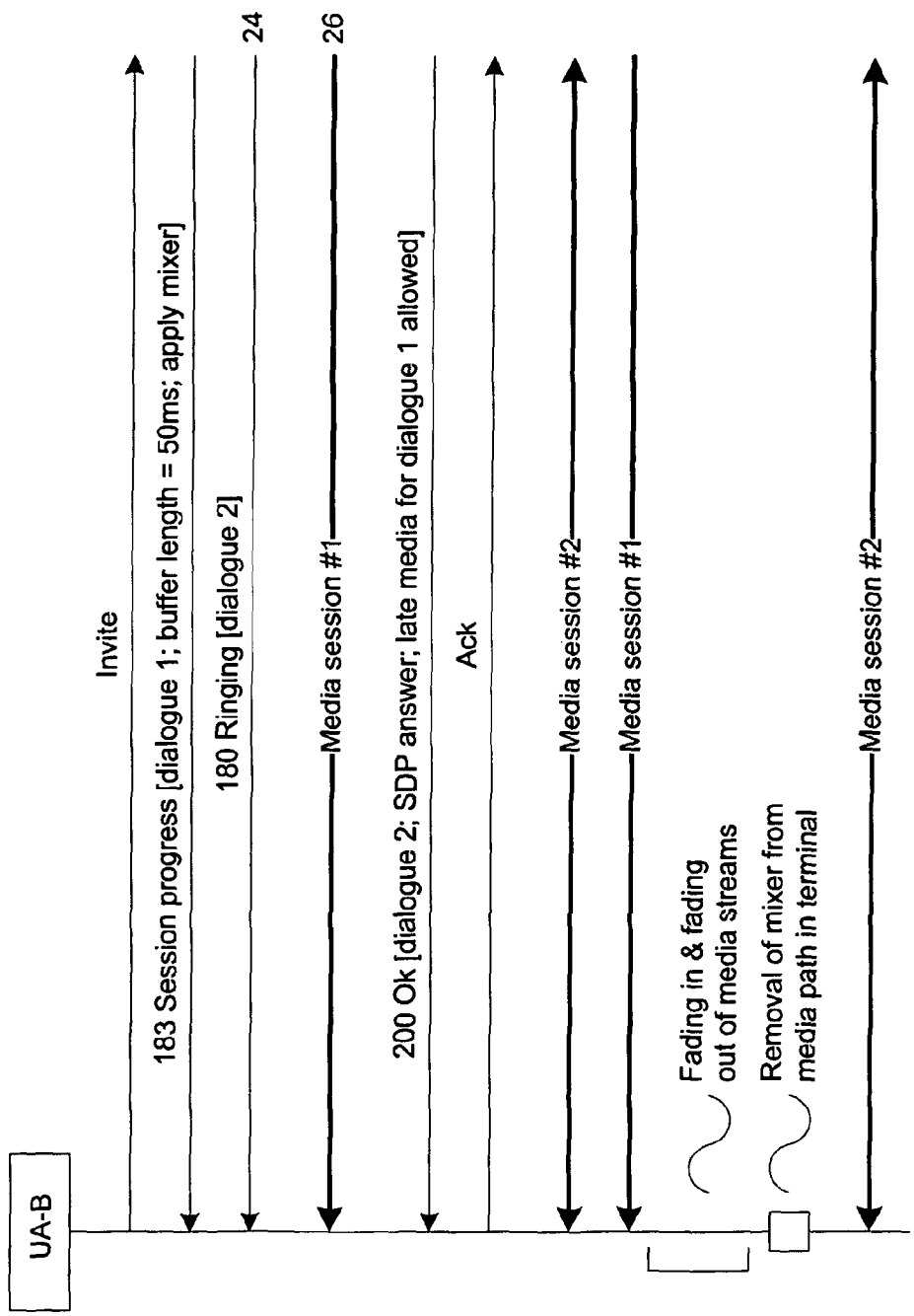
FIG. 3 shows signalling according to an embodiment of the invention.

FIG. 3 shows an example of signaling and media to/from UA-B 2. The signaling is to/from a designated entity in the IMS network, such as a SIP-AS 22. The media is flowing between UA-B and a personal greeting server 24 in a first media session (media session #1) and between UA-B and a remote party 26 in a second media session (media session #2). 100 Trying is not shown in FIG. 3.

In FIG. 3, the first 183 Session progress relates to a dialogue established between the UA-B 2 and the Personal greeting server 24. In this example, a designated entity in the IMS network, e.g. a SIP-AS 22 acting on behalf of the called party, indicates in the SDP answer associated with the media stream from the Personal greeting server 24 (by augmenting the SDP answer) in this 183 Session progress that a media mixer device 20 shall be applied. The 180 Ringing relates to a dialogue from the remote party 26. A first media stream now starts flowing from the Personal greeting server 24. It is understood that reliable provisional response (100rel, Prack) should be used for dialogue 1 (between UA-B 2 and Personal greeting server 24), since the SDP answer from the Personal greeting server should be transferred reliably. The usage of 100rel and Prack is not shown in FIG. 3, but is assumed to be well known.

When remote party 26 answers the call, said SIP-AS 22 augments the SDP answer from the remote party 26 by indicating that late media is allowed with respect to dialogue 1. UA-B 2 applies late media and fades the personal greeting out. When the personal greeting late media is terminated, UA-B 2 can remove the mixer device 20 from the media stream. This process of removing the mixer depicted in FIG. 4.

The amount of data of the first media stream buffered in the synchronization buffer of the media mixer device 20 is stepwise reduced. In this example, the length of the synchronization buffer is stepwise reduced. Reduction of the amount of data buffered, or of the memory size, is controlled by a buffer length controller 21 (memory size controller). When the synchronization buffer contains no data anymore, or the synchronization buffer has length 0, the synchronisation buffer and the media mixer device 20 are removed from the media path. It is noted that in practical implementations, the synchronization buffer can form part of the media mixer device 20. However, for clarity, in FIG. 4, the box labelled 'Media mixer' represents solely the entity responsible for mixing of synchronized media streams. The synchronisation buffer part is represented by the box labelled 'synchronisation buffer'.

It is emphasized that the above-described method does not introduce a persistent synchronization buffer. The synchronization buffer is linked-in in the media path during (smooth) switch-over between the two media streams. When the user plane of the call has reached a stable condition (again), specifically, has reached a state where there is media transfer between the calling party and the called party, the synchronization buffer is removed from the media path. Hence, there is no additional end-to-end delay for the media plane for the stable call connection.

Figure 4:
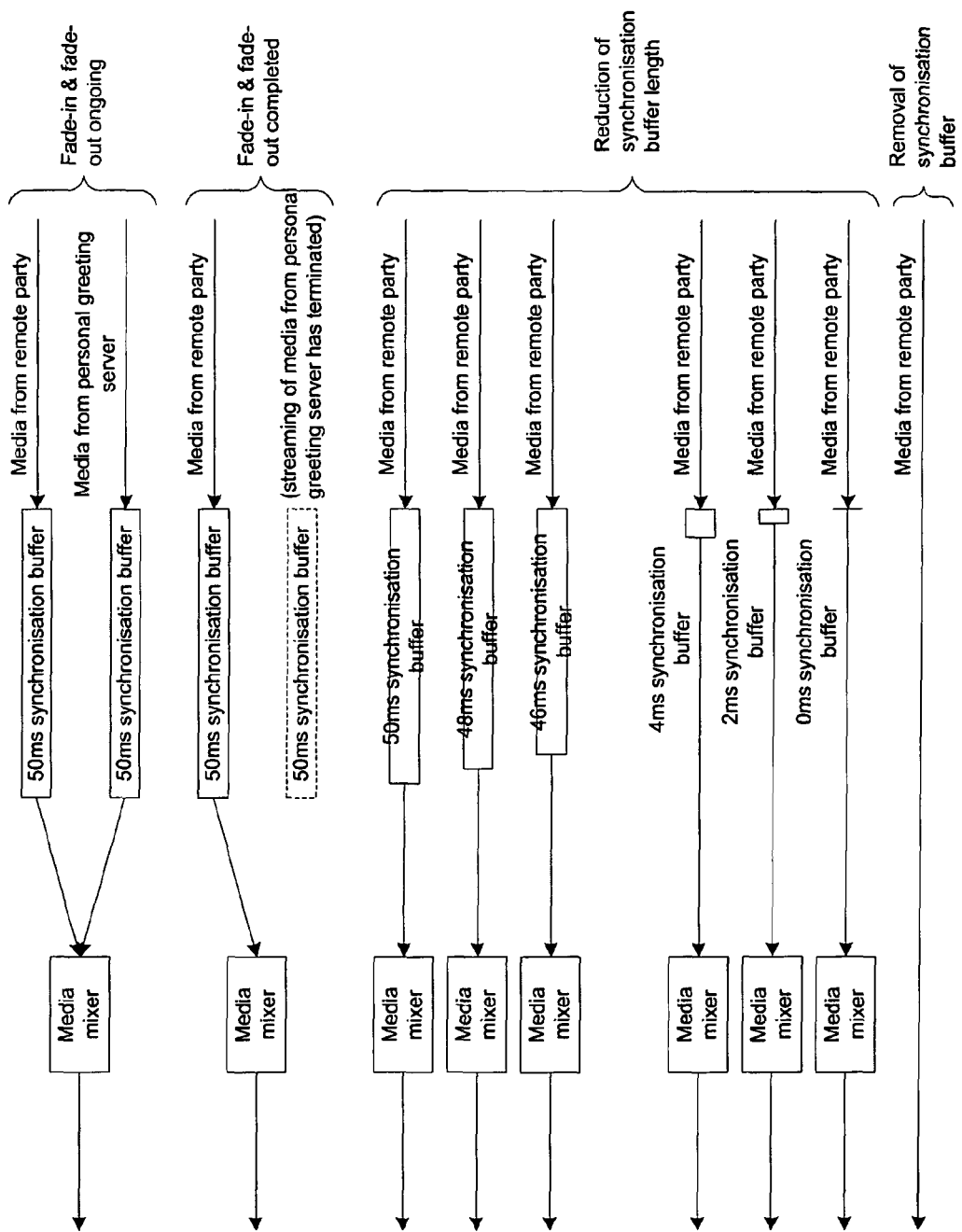
FIG. 4 shows a functioning of the invention

The above describes one embodiment of how the mixer device 20 can be removed from media path without causing abrupt media distortion. FIG. 4 provides the typical SIP sequence diagram for this embodiment. It shall be understood that various alternative methods are feasible without departing from the spirit of the invention. Preferably, these methods comply with the generic SIP signaling standard (IETF RFC 3261), with the offer-answer standard (IETF RFC 3264) and with the Session description protocol (IETF RFC 4566).

Updating Media Stream

Figure 5:
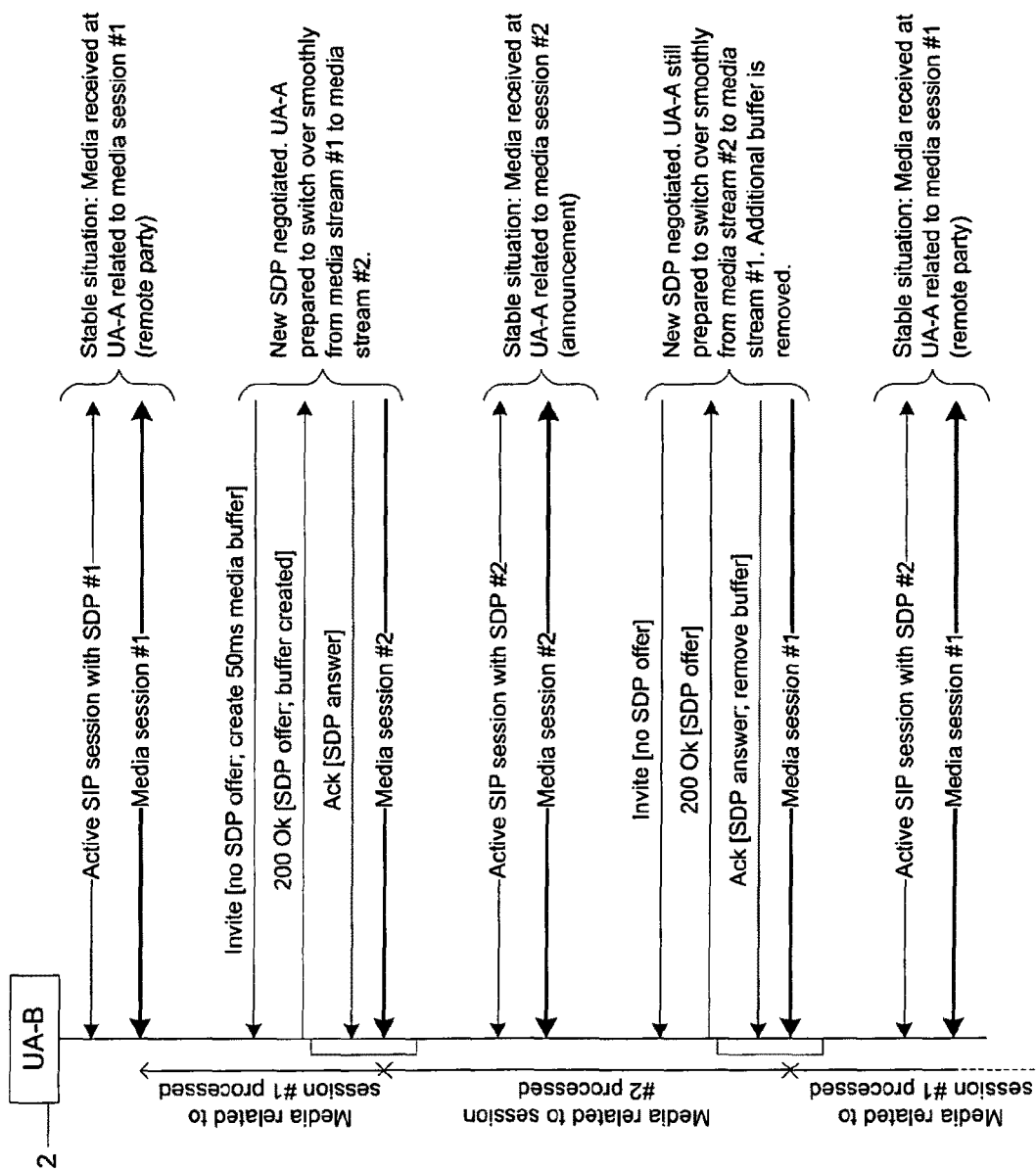
FIG. 5 shows signalling according to an embodiment of the invention.
Figure 6:
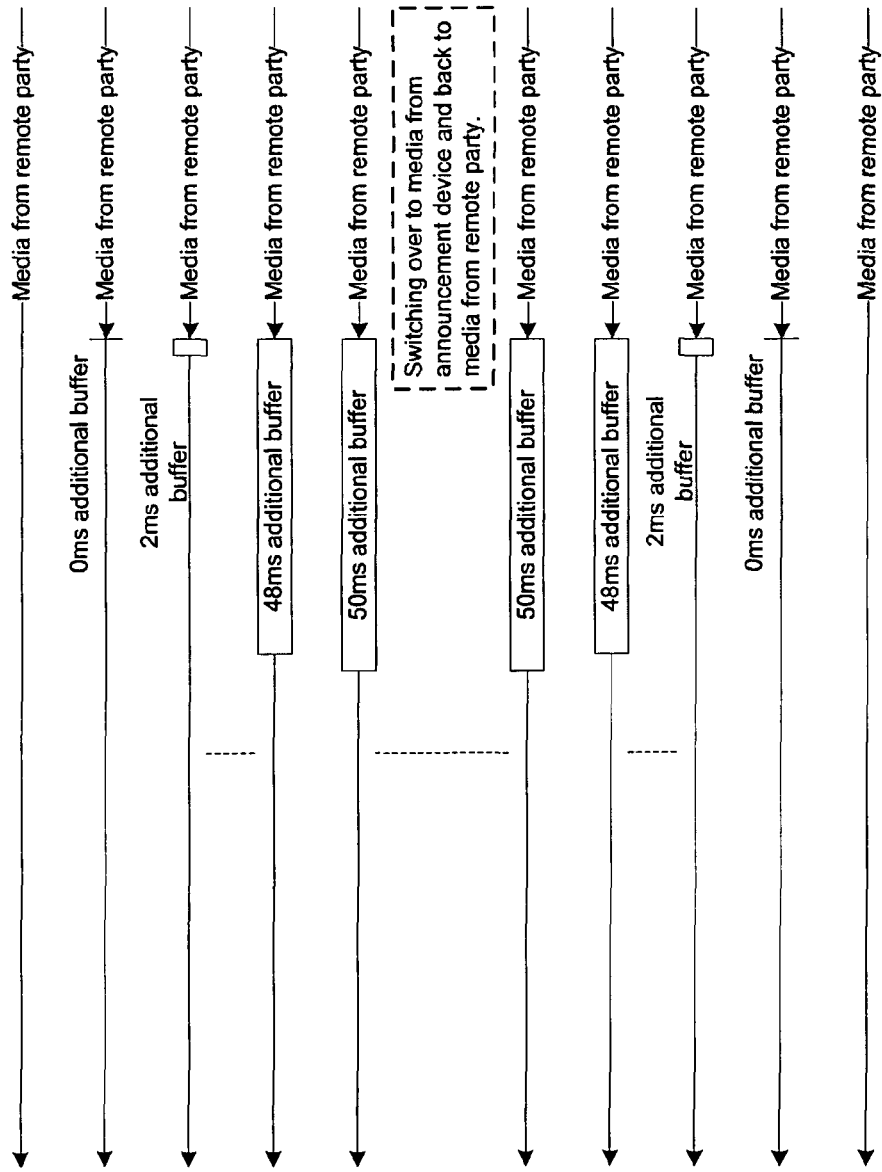
FIG. 6 shows a functioning of the invention.

FIG. 5 and FIG. 6 show an example of updating the media stream. When UA-B 2 receives the Invite (re-Invite) related to the updating of the SDP (for receiving the announcement), including an instruction to create a synchronisation buffer, it applies a final response as normal (200 Ok). The final response shall be sent when the synchronization buffer has been included in the media path. Including the synchronization buffer in the media path may be part of linking the media mixer device 20 into the media path.

FIG. 6 depicts how UA-B 2 will stepwise increase the (additional) media buffer and subsequently stepwise decrease the (additional) media buffer. When the buffer has a length of 50 ms (maximum length in this example), the switching over between the two media streams may occur. The buffer length of 50 ms in this example provides enough slack for switching from the first media stream to the second media stream without humanly noticeable disturbance.

The embodiment of FIG. 5 and FIG. 6 is an example how the SDP update, and update of the associated media stream, may be done for a UA, without causing abrupt media distortion. This method is particularly intended for the case whereby the SDP update entails receiving media from another remote destination, as may be the case for mid-call announcement. A typical SIP sequence diagram is provided for this embodiment. It shall be understood that various alternative methods are feasible without departing from the spirit of the invention. Preferably, these methods comply with the generic SIP signaling standard (IETF RFC 3261), with the offer-answer standard (IETF RFC 3264) and with the Session description protocol (IETF RFC 4566).

The above described capability may reside in a SIP terminal, but may also reside in an Access Session Border Gateway (A-SBG), e.g. in the case that the A-SBG maps multiple downstream SIP dialogues to a single upstream SIP dialogue and whereby the media stream is traversing the A-SBG.

Above, updating media stream, is described by means of an embodiment that entails functionality in the SIP terminal. Hence, this method may be applied in networks that serve designated terminals that support this capability. Smooth media update may be considered as functional component of a standard like Multimedia Telephony (MMTel). When a terminal establishes communication, it may indicate its support of MMTel and specifically, its support of this specific aspect of the MMTel. In that case, the SIP application server, e.g. the MMTel application server, has the capability to use this capability in the terminal.

IMS has adequate mechanism through which the terminal and the core network can exchange indication regarding the supported capability. Hence, the signaling details for the terminal to reports its support of the media reception buffer size (or filling level) control is not further described here.

Smooth media update may be applied, particularly in situations whereby a SIP-UA shall start receiving media from another remote destination. The UA is prepared for the switch-over from one media stream to another media stream through the temporary insertion and stepwise increase of a media synchronization buffer, also termed media reception buffer hereinabove. Increase of the amount of data buffered, or of the memory size, is controlled by the buffer length controller 21. The synchronization buffer allows for said smooth switch-over from one media stream to the other. It allows for non-synchronised arrival of the respective media streams. The (temporarily inserted) synchronization buffer ensures that, under non-exceptional circumstances, no media is lost during the switch-over.

The smooth media update is further achieved by providing IMS with the capability to control the media synchronization buffer length (or buffer filling level) in the SIP-UA.

As described above, the method according to the invention optionally comprises providing a media mixer device in the first and second media streams and mixing the first and second media streams in the period between starting forwarding the data of the second media stream from the second media reception buffer and forwarding the last data of the first media stream from the first media reception buffer. The method also optionally comprises buffering in the first media reception buffer an amount of data of the first media stream corresponding to a time delay equal to or longer than a time delay of the media mixer device, and subsequently linking the media mixer device into the first and second media streams. The method also optionally comprises the steps of, e.g. directly, forwarding the data of the first media stream without buffering the data of the first media stream in the first media reception buffer, and subsequently linking the first media reception buffer to the first media stream prior to buffering data of the first media stream in a first media reception buffer. The method also optionally comprises stepwise decreasing the amount of data of the second media stream buffered in the second media reception buffer while forwarding the data of the second media stream from the second media reception buffer to the recipient, e.g. until the second media reception buffer includes a fourth amount of data of the second media stream. The method also optionally comprises removing the second media reception buffer from a media path of the second media stream when the second reception buffer includes the fourth amount of data of the second media stream, and subsequently, e.g. directly, forwarding the data of the second media stream without buffering the data of the second media stream in the second media reception buffer.

It will be appreciated that the controlling unit, the first and second reception unit, the first and second media reception buffer, the selection unit, the forwarding unit, and/or the buffer size controller can be embodied as dedicated electronic circuits, possibly including software code portions. The controlling unit, the first and second reception unit, the first and second media reception buffer, the selection unit, the forwarding unit, and/or the buffer size controller can also be embodied as software code portions executed on, and e.g. stored in a memory of, a programmable apparatus such as a computer.

The invention provides an improved method and device for media stream handling. The invention provides the advantage that the start of forwarding the second media stream can be accurately synchronised with the first media stream. The invention allows for smooth, ad hoc insertion and removal of a media mixer device in a media (speech) stream path without disturbance. It provides the advantage that it is possible to link a media mixer device into the two media streams without disturbance. It also provides the advantage that a media mixer device can be removed from (at least one of) the two media streams without disturbance. The invention also allows for in-session update of a media stream in accordance with an updated Session Description Protocol (SDP) without disturbance. The invention provides an enhanced user experience, allowing switching from one media stream to another without disturbance. Hence, the user experience does not suffer from undesired artefacts such as blanks (periods with no sound), clicks, pops, periods of missing data (e.g. missing speech) or the like.

In the foregoing specification, the invention has been described with reference to specific examples of embodiments of the invention. It will, however, be evident that various modifications and changes may be made therein without departing from the broader spirit and scope of the invention as set forth in the appended claims.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A method for switching from forwarding a first media stream to forwarding a second media stream to a recipient in a Voice over Internet Protocol (VoIP) based communications network, the second media stream having a different originating source than the first media stream, the method comprising:

while receiving the first media stream, prior to forwarding the data of the first media stream, storing a first amount of data of the first media stream in a first memory;

retrieving the first media stream from the first memory, introducing a first latency in the first media stream, and forwarding the first media stream to the recipient;

detecting either that reception of the second media stream is expected by receiving a message indicating that the second media stream is forthcoming, or that the start of the second media stream has been received;

subsequent to receiving the message indicating that a second media stream is forthcoming, or coincident with the detecting that the start of the second media stream has been received, and while forwarding the data of the first media stream to the recipient, receiving the second media stream and storing a second amount of data of the second media stream in a second memory;

responsive to said detecting, stepwise increasing the latency in the first media stream by stepwise increasing the amount of data of the first media stream stored in the first memory, until the first memory stores a third amount of data of the first media stream, so as to introduce a third latency in the first media stream, wherein stepwise increasing the amount of data of the first media stream stored in the first memory comprises increasing the amount of data from the first amount to the third amount in multiple steps;

ceasing receiving of the first media stream, and continuing to forward data of the first media stream contained in the first memory to the recipient; and retrieving data of the second media stream from the second memory and forwarding the second media stream to the recipient;

wherein the method further comprises providing a media mixer device in the first and second media streams and mixing the first and second media streams in the period between starting forwarding the data of the second media stream from the second memory and forwarding the last data of the first memory from the first memory.

2. The method of claim 1, wherein the detecting comprises receiving the message indicating that the second media stream is forthcoming, the message further indicating an imminent switch from forwarding the first media stream to forwarding the second media stream, and wherein the stepwise increasing of the amount of data of the first media stream stored in the first memory is started prior to reception of the second media stream.

3. The method of claim 1, comprising storing in the first memory an amount of data of the first media stream corresponding to a time delay equal to or longer than a time delay of the media mixer device, and subsequently linking the media mixer device into the first and second media streams.

4. The method of claim 1, further comprising, prior to storing data of the first media stream in the first memory:
   forwarding the data of the first media stream without storing the data of the first media stream in the first memory, and, subsequently,
   linking the first memory to the first media stream.

5. The method of claim 1, further comprising stepwise decreasing the latency in the second media stream by stepwise decreasing the amount of data of the second media stream stored in the second memory while retrieving the data of the second media stream from the second memory and forwarding it to the recipient until the second memory includes a fourth amount of data of the second media stream, wherein stepwise decreasing the amount of data of the second media stream stored in the second memory comprises decreasing the amount of data from the second amount to the fourth amount in multiple steps.

6. The method of claim 5, further comprising:
   removing the second memory from a media path of the second media stream when the second memory includes the fourth amount of data of the second media stream; and, subsequently,
   forwarding the data of the second media stream without storing the data of the second media stream in the second memory.

7. The method of claim 1, wherein the switching is part of a Session Description Protocol (SDP) update procedure.

8. The method of claim 1, wherein the VoIP based communications network is an Internet Protocol Multimedia Subsystem (IMS) network, and wherein the switching from forwarding a first media stream to forwarding a second media stream is performed in a Multimedia Resource Function Processor (MRFP) or a Session Border Gateway (SBG).

9. A media handling unit arranged for switching from forwarding a first media stream to forwarding a second media stream to a recipient in a Voice over Internet Protocol (VoIP) based network, the second media stream having a different originating source than the first media stream, the media handling unit comprising:
   a first reception unit configured to receive the first media stream;
   a second reception unit configured to receive the second media stream;
   a selection unit configured to select the first media stream and/or the second media stream;
   a forwarding unit configured to forward the data of the selected media stream;
   a first memory having a first size and configured to temporarily store data of the first media stream prior to forwarding data of the first media stream, introducing a first latency in the first media stream;
   a second memory having a second size and configured to temporarily store data of the second media stream prior to forwarding data of the second media stream, introducing a second latency in the second media stream;
   a memory size controller configured to stepwise increase or decrease the first and/or second latency, respectively, by stepwise increasing or decreasing the amount of data of the first and/or second media stream stored in the first and/or second memory respectively, wherein said stepwise increasing or decreasing the amount of data stored in the first and/or second memory comprises, respectively, increasing or decreasing the amount of data in multiple steps; and
   a controlling unit, wherein the controlling unit is configured to
      detect either that reception of the second media stream is expected by receiving a message indicating that the second media stream is forthcoming, or that the start of the second media stream has been received,
      responsive to said detection, instruct the memory size controller to stepwise increase the amount of data of the first media stream stored in the first memory, or the size of the first memory, while forwarding the data of the first media stream prior to switching from forwarding the first media stream to forwarding the second media stream, and/or
      instruct the memory size controller to stepwise decrease the amount of data of the second media stream stored in the second memory, or the size of the second memory while forwarding the data of the second media stream after switching from forwarding the first media stream to forwarding the second media stream;
   wherein the selection unit, the first memory and the second memory are part of a media mixer device configured to mix the first and second media streams during a period of overlap.

10. The media handling unit of claim 9, further comprising a third reception unit configured to receive the message indicating that the second media stream is forthcoming.

11. The media handling unit of claim 9, wherein the controlling unit is configured to instruct the forwarding unit to forward data of the first media stream without storing the data of the first media stream in the first memory, and wherein the controlling unit is configured to link the first memory into the first media stream prior to storing data of the first media stream in the first memory.

12. The media handling unit of claim 9, wherein the controlling unit is further configured to remove the second memory from a media path of the second media stream, after decreasing the amount of data of the second media stream stored in the second memory, and to subsequently instruct the forwarding unit to forward data of the second media stream without storing the data of the second media stream in the second memory.

13. The media handling unit of claim 9, wherein the media handling is part of a Multimedia Resource Function Processor (MRFP) or a Session Border Gateway (SBG).

14. The method of claim 1, wherein each of the multiple steps increases the amount of data by a step size amount and wherein the difference between the first amount and the third amount is a multiple of the step size amount.

15. The method of claim 14, wherein the first media stream is received in 20 ms packets and the step size amount is 10 ms or less.

* * * * *